US009233750B2

(12) United States Patent
Savarit et al.

(10) Patent No.: US 9,233,750 B2
(45) Date of Patent: Jan. 12, 2016

(54) METHOD AND DEVICE FOR DETERMINING A LATERAL TRAJECTORY OF AN AIRCRAFT AND ASSOCIATED FLIGHT MANAGEMENT SYSTEM

(71) Applicant: THALES, Neuilly-sur-Seine (FR)

(72) Inventors: Vincent Savarit, Toulouse (FR); Emmanuel Dewas, Toulouse (FR)

(73) Assignee: Thales, Courbevoie (FR)

( * ) Notice: Subject to any disclaimer, the term of this patent is extended or adjusted under 35 U.S.C. 154(b) by 127 days.

(21) Appl. No.: 13/721,538

(22) Filed: Dec. 20, 2012

(65) Prior Publication Data
US 2013/0166112 A1 Jun. 27, 2013

(30) Foreign Application Priority Data

Dec. 22, 2011 (FR) ...................................... 11 04011

(51) Int. Cl.
*G05D 1/02* (2006.01)
*B64C 19/00* (2006.01)

(52) U.S. Cl.
CPC ...................................... *B64C 19/00* (2013.01)

(58) Field of Classification Search
USPC ........... 701/3, 4, 11, 14, 23, 25, 26, 120, 122, 701/400, 408, 409, 410, 411, 416, 528, 532, 701/533, 300, 302; 340/945, 963, 971, 340/995.1, 995.14, 995.19, 995.2, 995.21; 244/75.1, 76 R, 175
See application file for complete search history.

(56) References Cited

U.S. PATENT DOCUMENTS

| 7,698,026 B2* | 4/2010 | Dey et al. ........................... 701/3 |
| 8,116,970 B2* | 2/2012 | Hoofd et al. ................... 701/122 |
| 8,150,623 B2* | 4/2012 | Bitar et al. ..................... 701/467 |
| 8,630,790 B1* | 1/2014 | Bailey et al. .................. 701/120 |
| 2003/0088360 A1* | 5/2003 | Ikhlef et al. ................... 701/202 |
| 2005/0049762 A1* | 3/2005 | Dwyer .............................. 701/3 |
| 2008/0154490 A1* | 6/2008 | Hoofd et al. ................... 701/202 |
| 2009/0157237 A1* | 6/2009 | Bitar et al. ........................ 701/3 |

FOREIGN PATENT DOCUMENTS

| WO | 01/50087 A2 | 7/2001 |
| WO | 2008/054914 A2 | 5/2008 |

* cited by examiner

*Primary Examiner* — Thomas Tarcza
*Assistant Examiner* — Edward J Pipala
(74) *Attorney, Agent, or Firm* — Baker & Hostetler LLP

(57) ABSTRACT

A method, and an associated device, is provided for the determination, by a flight management system of an aircraft, of a lateral trajectory of said aircraft on the basis of a predefined flight plan allowing consecutive conflicts to be resolved in an improved manner. This allows an improved lateral trajectory to be designed in the case where multiple trajectory conflicts exist. The trajectory obtained is closer to the flight plan defined by the pilot. The propagation of trajectory conflicts to the following flight segments is thus avoided. In fact, instead of propagating the trajectory conflict from one resolution to another, the method allows the conflict to be resolved in a space delimited at most by the input of the first conflict and the output of the last conflict.

7 Claims, 7 Drawing Sheets

METHOD AND DEVICE FOR DETERMINING A LATERAL TRAJECTORY OF AN AIRCRAFT AND ASSOCIATED FLIGHT MANAGEMENT SYSTEM

CROSS-REFERENCE TO RELATED APPLICATION

This application claims priority to foreign French patent application No. FR 1104011, filed on Dec. 22, 2011, the disclosure of which is incorporated by reference in its entirety.

FIELD OF THE INVENTION

The invention relates to the domain of flight management systems (FMS) of an aircraft and more particularly the calculation of the trajectory followed by the aircraft.

BACKGROUND

During flight preparation or during a rerouting, the crew enters its flight plan onto a dedicated computer: the FMS (Flight Management System).

On the basis of the flight plan defined by the pilot, the trajectory is calculated according to the geometry defined by the flight segments and the crossing points (generally referred to as LEGS as defined in Arinc 424 norm, flight segments representing the path of the leg and crossing points their termination) and/or the altitude and speed conditions. A trajectory part allowing two flight segments to be interconnected is referred to as a transition.

In certain cases, one or more transitions may be in conflict. A conflict refers to a discontinuity of the trajectory in the transitions. FIG. 1a shows a first example of conflict between two successive transitions.

FIG. 1a shows a flight plan comprising three consecutive flight segments L1, L2, L3 and a first transition T1 between the first segment L1 and the second segment L2 on the one hand, and, on the other hand, a second transition T2 between the second segment L2 and a third segment L3. A discontinuity exists between the two transitions.

FIG. 1b shows an example of conflict resolution for the example previously presented. In this example, the turn of the second transition (to the right) is in the opposite direction to the turn of the first transition (to the left).

The resolution of the conflict therefore comprises the determination of a straight line tangential to the two turns, which are then connected via this tangent.

FIG. 2a shows a flight plan comprising three consecutive flight segments L1, L2, L3 and a first transition T1 between the first segment L1 and the second segment L2 on the one hand, and, on the other hand, a second transition T2 between the second segment L2 and a third segment L3. A discontinuity exists between the two transitions.

FIG. 2b shows an example of conflict resolution for the example previously presented. In this example, the turn of the second transition (to the left) is in an identical direction to the turn of the first transition (to the right).

The resolution of the conflict comprises the determination of a capture segment of the third segment L3 on the basis of the first transition. The trajectory between the first segment L1 and the third segment L3 comprises the first transition T1 and the determined capture segment.

FIG. 3a shows an example of consecutive conflicts. FIG. 3a shows a flight plan comprising four consecutive flight segments L1, L2, L3, L4 and a first transition T1 between the first segment L1 and the second segment L2, a second transition T2 between the second segment L2 and a third segment L3, a third transition T3 between the third segment L3 and a fourth segment L4. A first conflict exists between the first and the second transition and a second conflict between the second (T2) and the third transition (T3).

FIG. 3b shows an example of multiple conflict resolution. The conflict resolution comprises the determination of a straight line tangential to the first and the second transition. The trajectory between the first segment L1 and the second segment L2 comprises a portion of the first transition, a portion of the tangential straight line, a portion of the second transition and a joining segment (R1) to the second segment L2.

The disadvantage of this solution lies in obtaining a trajectory which deviates from the trajectory defined by the pilot. Furthermore, this solution distances the joining point of the fourth segment L4, which may potentially generate a third transition conflict.

International application WO 2008/054914 discloses a method for resolving transition conflicts on the basis of three consecutive legs.

SUMMARY OF THE INVENTION

The invention aims to overcome the aforementioned problems by proposing a method for the determination, by a flight management system of an aircraft, of a lateral trajectory of said aircraft on the basis of a predefined flight plan allowing consecutive conflicts to be resolved in an improved manner.

For this purpose, the subject-matter of the invention is a method for the determination, by a flight management system of an aircraft, of a lateral trajectory of said aircraft on the basis of a predefined flight plan, said flight plan comprising consecutive flight segments delimited by crossing points, said method being characterized in that it comprises steps consisting in:

calculating (401) a first transition (T1) between a first segment (L1) and a second segment (L2) consecutive to the first segment (L1) and a second transition (T2) between the second segment (L2) and a third segment (L3) consecutive to the second segment (L2), detecting (402) a first conflict (C1) between the first transition (T1) and the second transition (T2), if no conflict is detected, then returning to the transition calculation step (401) applied to the second segment (L2), to the third segment (L3) and to a fourth segment (L4) consecutive to the third segment, otherwise resolving (403) the first detected conflict (C1), calculating (404) a third transition (T3) between the third segment (L3) and a fourth segment (L4), detecting (405) a second conflict (C2) between the second transition (T2) and the third transition (T3), if no conflict is detected, then the return to the transition calculation step (401) applied to the third segment (L3), to the fourth segment (L4) and to a fifth segment (L5) consecutive to the fourth segment, otherwise jointly resolving (406) the first conflict (C1) and the second conflict (C2), and returning to the step (404) of calculating a transition applied to the fourth segment and to the fifth segment.

Advantageously, the joint resolution (406) of the first conflict (C1) and the second conflict (C2) comprises:

the determination of a first straight line (Tang1) tangential to the first transition (T1) at a first point (P1) and tangential to the second transition (T2) at a second point (P2), the determination of a second straight line (Tang2) tangential to the second transition (T2) at a third point (P3) and tangential to the third transition (T3) at a fourth point (P4).

Advantageously, the joint resolution (406) of the first conflict (C1) and the second conflict (C2) further comprises:

If (406.1) the turn of the first transition (T1) is in a direction opposite to the direction of the turn of the second transition (T2) and, if (406.2) the turn of the second transition (T2) is in a direction opposite to the direction of the turn of the third transition (T3), then:

if (406.4) there is no intersection between a portion of the straight line (Tang1) defined by the first point and the second point (P2), on the one hand, and a portion of the straight line of the second tangential straight line (Tang2) defined by the third point (P3) and the fourth point (P4), on the other hand, then a step B (406.5) comprising the determination of the trajectory between the first segment (L1) and the fourth segment (L4), said trajectory comprising a portion of the first transition (T1), a portion of the first tangent (Tang1), a portion of the second transition (T2), a portion of the second tangent (Tang2), a portion of the third transition (T3), otherwise a step C (406.6) comprising:

the determination of a transition segment between the first tangent (Tang1) and the second tangent (Tang2), the transition segment being tangential to the first tangent (Tang1) at a fifth point (P5) and tangential to the second tangent (Tang2) at a sixth point (P6), the trajectory between the first segment (L1) and the fourth segment (L4) comprising a portion of the first transition (T1) going from the first segment (L1) to the first point (P1), a portion of the first tangent (Tang1) going from the first point (P1) to the fifth point (P5), the transition segment between the fifth point and the sixth point (P6), a portion of the second tangent (Tang2) between the sixth point and the fourth point and a portion of the third transition (T3) between the fourth point and the fourth segment (L4).

Advantageously, the method furthermore comprises a step of detection of a conflict between the transition segment and the first transition (T1) or the second transition (T2), following the step C, and comprising, if (406.7) a conflict is detected, a step D (406.8) comprising:

the determination of a joining segment between the first transition (T1) and the fourth segment (L4), the trajectory between the first segment (L1) and the fourth segment (L4) comprising a portion of the first transition up to the first point and the joining segment between the first point and the fourth segment (L4).

Advantageously, the method further comprises:

If the turn of the first transition (T1) is in a direction opposite to the direction of the turn of the second transition (T2) and, if the turn of the second transition (T2) is in a direction identical to the direction of the turn of the third transition (T3) then a step A comprising the determination of the trajectory between the first segment (L1) and the fourth segment (L4), said trajectory comprising a portion of the transition (T1), a portion of the tangent (Tang1), a portion of the transition (T2), the joining segment (R2).

Advantageously, a transition being a portion comprising a turn, the resolution (403) of the first detected conflict (C1) comprises:

If (403.1) the turn of the first transition (T1) is in a direction opposite to the direction of the turn of the second transition (T2), then (403.2), the determination of a first straight line (Tang1) tangential to the first transition (T1) at a first point (P1) and tangential to the second transition (T2) at a second point (P2), the trajectory between the first segment and the third segment comprising a portion of the first transition going to the first point, a portion of the first tangent (Tang1) going from the first point (P1) to the second point (P2), and a portion of the second transition (T2) going from the second point (P2) to the third segment (L3), otherwise (403.3), the determination of a capture segment of the third segment (L3) on the basis of the first transition, the trajectory between the first segment (L1) and the third segment (L3) comprising the first transition (T1) and the determined capture segment.

The invention also relates to a device for determining a lateral trajectory of an aircraft, characterized in that it is configured to carry out the method according to the invention.

The invention also relates to a flight management system, characterized in that it comprises the device according to the invention.

The invention allows an improved lateral trajectory to be designed in the case where multiple trajectory conflicts exist.

The trajectory obtained is closer to the flight plan defined by the pilot. The propagation of trajectory conflicts to the following flight segments is thus avoided. In fact, instead of propagating the trajectory conflict from one resolution to another, the method allows the conflict to be resolved in a space delimited at most by the input of the first conflict and the output of the last conflict.

BRIEF DESCRIPTION OF THE DRAWINGS

The invention will be better understood and other advantages will become evident from a reading of the detailed description and with the aid of the figures, in which.

DETAILED DESCRIPTION

The invention relates to a method for the determination, by a flight management system of an aircraft, of a lateral trajectory of said aircraft on the basis of a predefined flight plan.

Figure 1A:
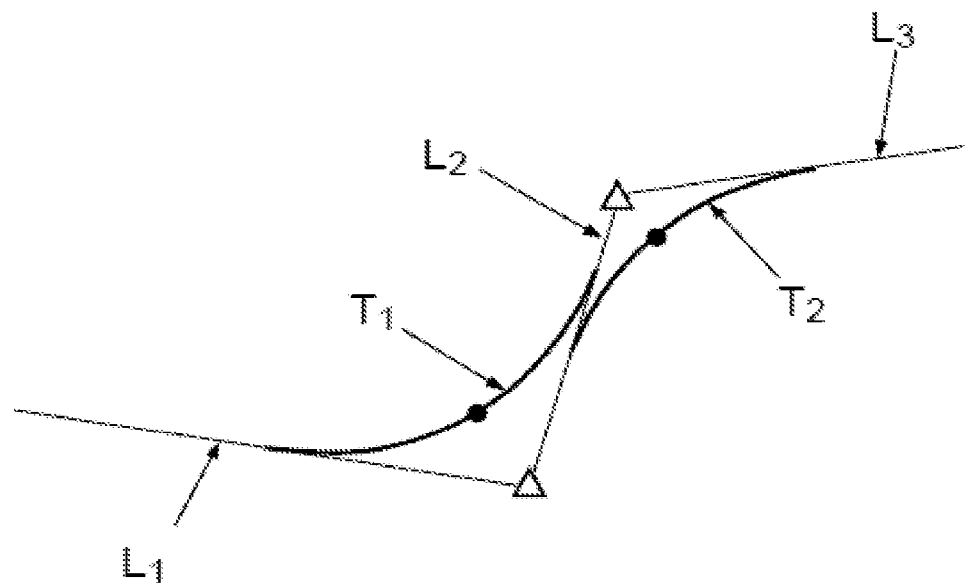
FIG. 1a shows a first prior art example of conflict between two successive transitions.
Figure 1B:
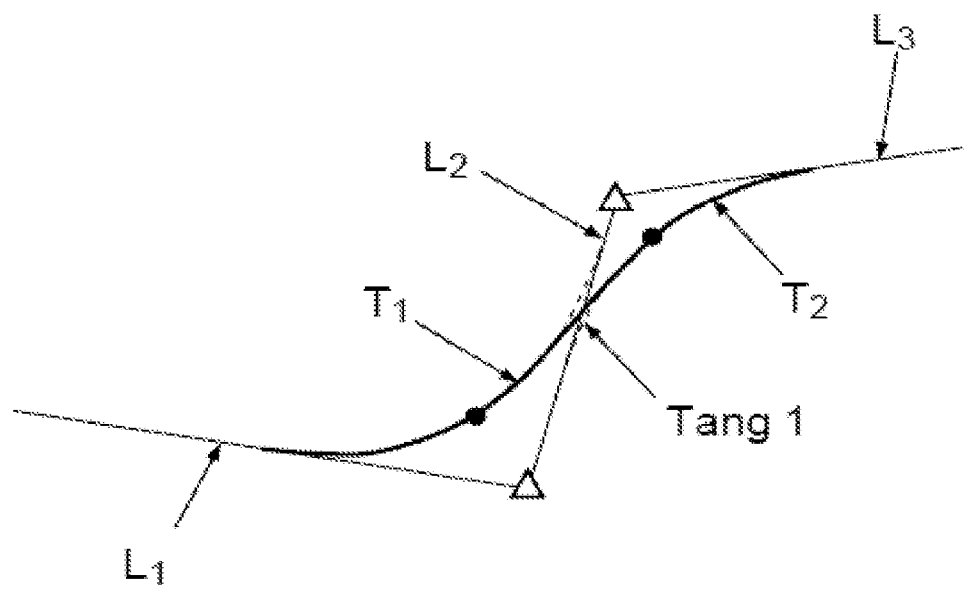
FIG. 1b shows a prior art example of resolution of the first conflict.
Figure 2A:
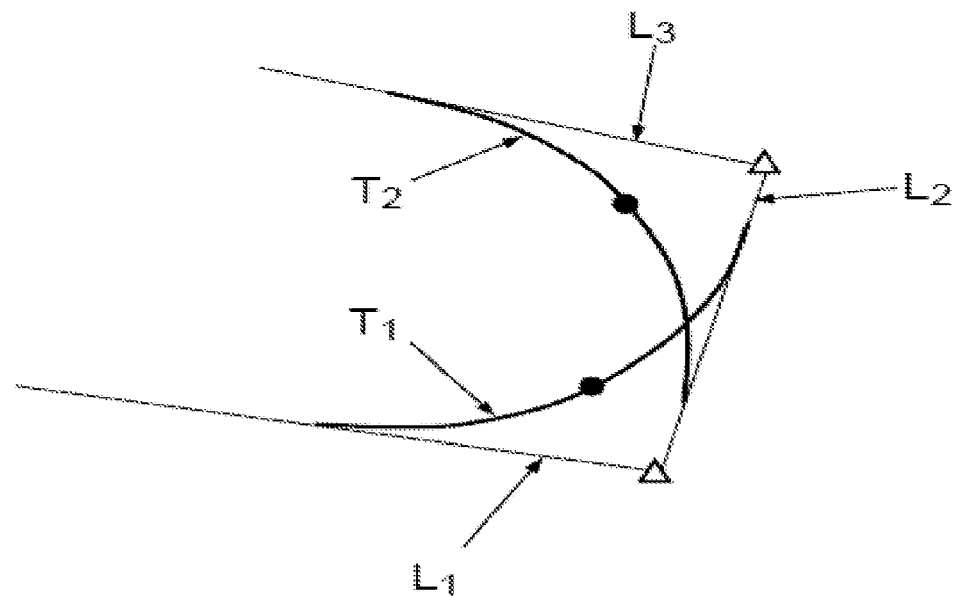
FIG. 2a shows a second prior art example of conflict between two successive transitions.
Figure 2B:
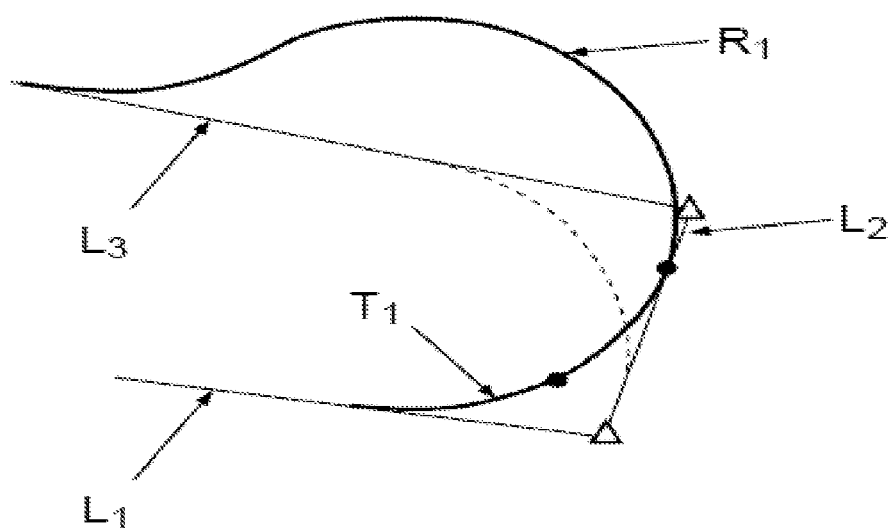
FIG. 2b shows a prior art example of resolution of the second conflict.
Figure 3A:
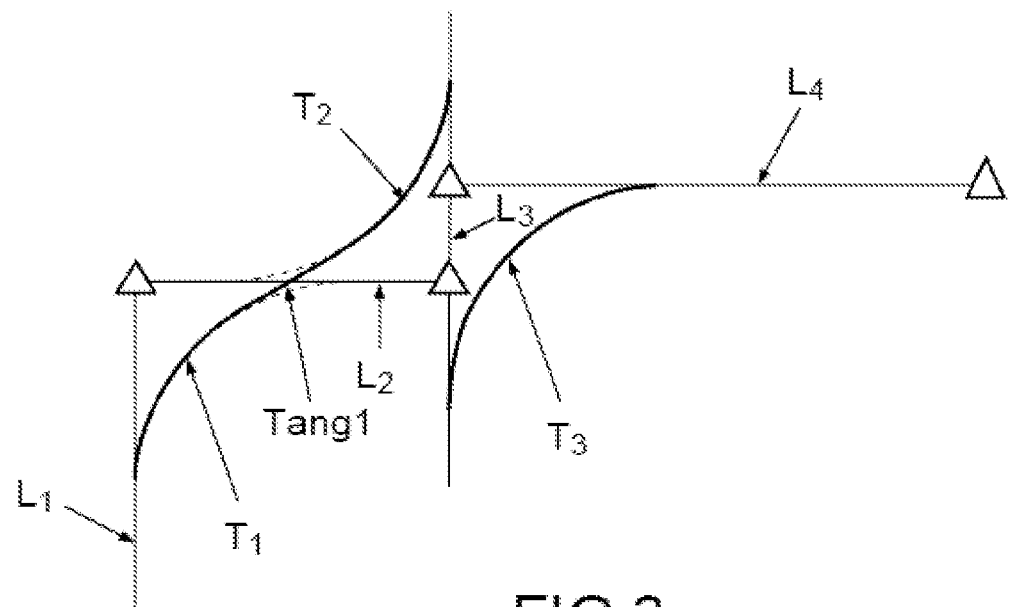
FIG. 3a shows a prior art third example of conflict between three successive transitions.
Figure 3B:
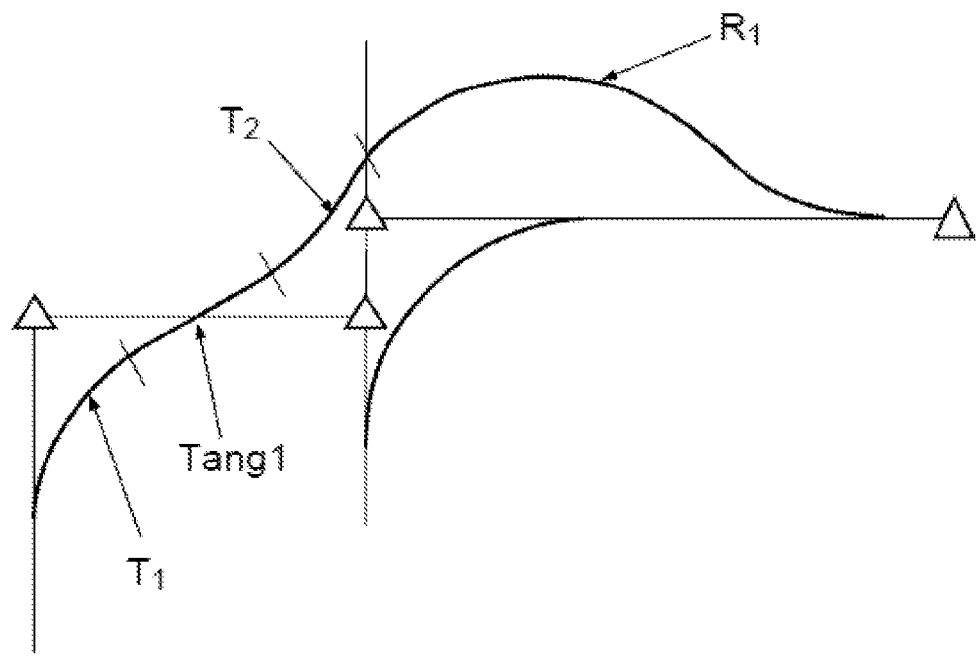
FIG. 3b shows a prior art third example of conflict resolution.
Figure 4:
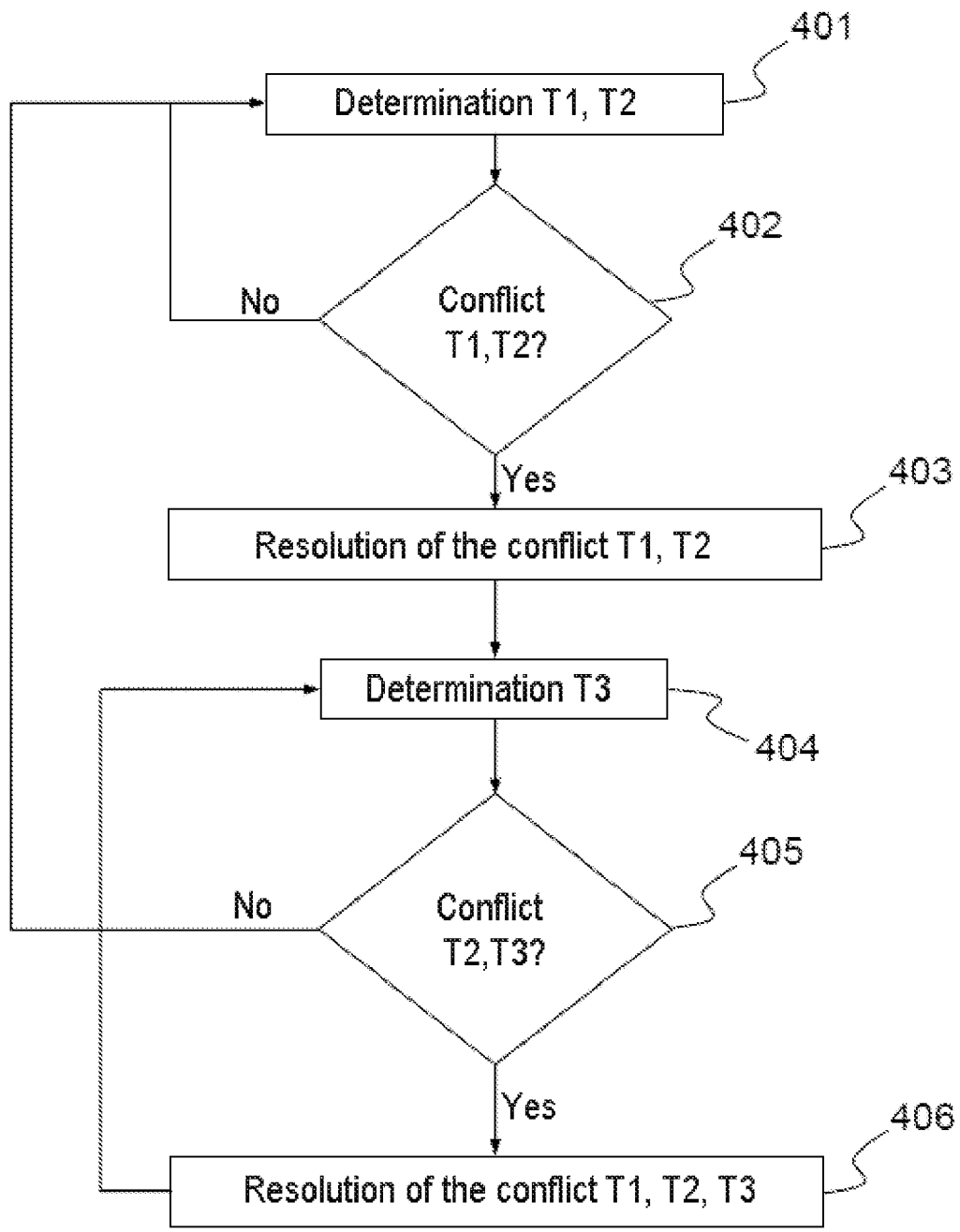
FIG. 4 shows a diagram representing the method according to the invention.
Figure 7:
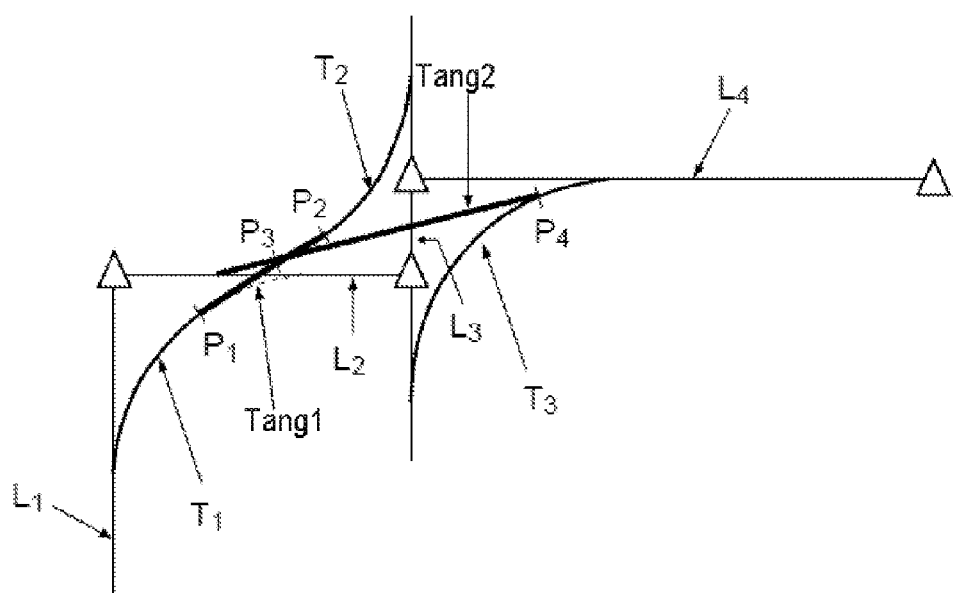
FIG. 7 shows a diagram representing the detail of the step of joint resolution (403) of the first conflict (C1) and the second conflict (C2)

FIG. 4 shows a diagram representing the method according to the invention. FIG. 7 shows an example of multiple conflicts to which the method according to the invention is applied. FIG. 7 shows a flight plan comprising four consecutive flight segments L1, L2, L3, L4 delimited by crossing points.

The method according to the invention comprises steps consisting in:
- calculating 401 a first transition T1 between a first segment L1 and a second segment L2 consecutive to the first segment L1 and a second transition T2 between the second segment L2 and a third segment L3 consecutive to the second segment L2,
- detecting 402 a first conflict C1 between the first transition T1 and the second transition T2,
- if no conflict is detected, then returning to the transition calculation step 401 applied to the second segment L2, to the third segment L3 and to a fourth segment L4 consecutive to the third segment,
- otherwise resolving 403 the first detected conflict C1,
- calculating 404 a third transition T3 between the third segment L3 and a fourth segment L4,
- detecting 405 a second conflict C2 between the second transition T2 and the third transition T3,
- if no conflict is detected, then the return to the transition calculation step 401 applied to the third segment L3, to the fourth segment L4 and to a fifth segment L5 consecutive to the fourth segment,
- otherwise jointly resolving 406 the first conflict C1 and the second conflict C2, and
- returning to the step 404 of calculating a transition applied to the fourth segment and to the fifth segment.

Figure 5:
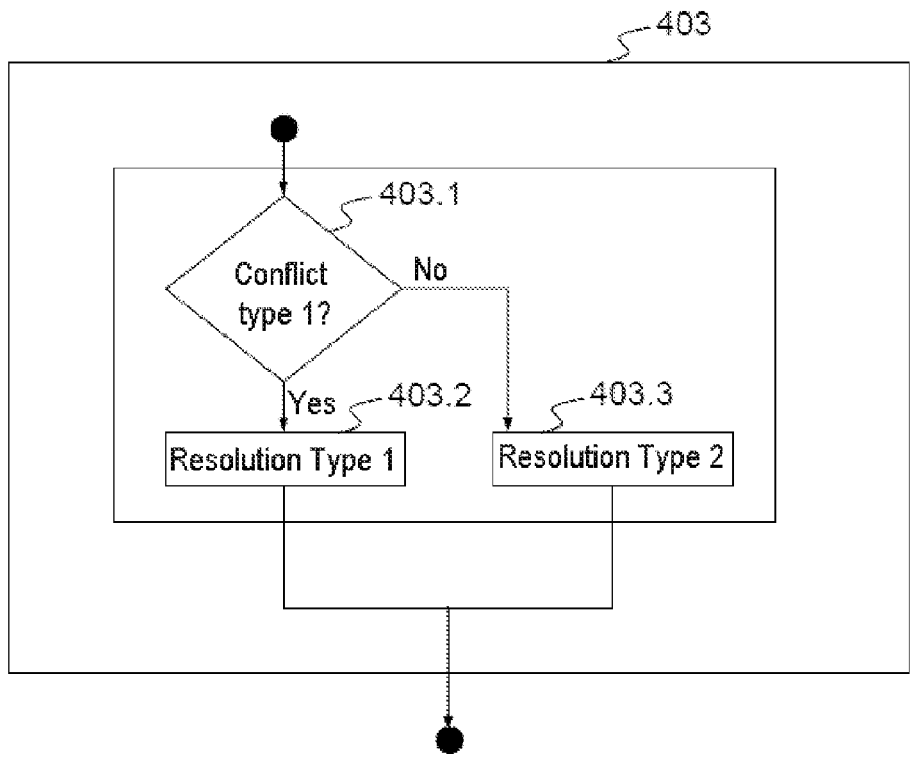
FIG. 5 shows an example of multiple conflicts to which the method according to the invention is applied.

FIG. 5 shows a diagram representing the detail of the step 403 of resolution of the first detected conflict C1. It should be remembered that a transition comprises a turn. The resolution 403 of the first detected conflict C1 comprises:
  If 403.1, the turn of the first transition T1 is in a direction opposite to the direction of the turn of the second transition T2,
    then 403.2, the determination of a first straight line Tang1 tangential to the first transition T1 at a first point P1 and tangential to the second transition T2 at a second point P2, the trajectory between the first segment and the third segment comprising a portion of the first transition going to the first point P1, a portion of the first tangent Tang1 going from the first point P1 to the second point P2 and a portion of the second transition T2 going from the second point P2 to the third segment;
    otherwise 403.3, the determination of a capture segment of the third segment L3 on the basis of the first transition, the trajectory between the first segment L1 and the third segment L3 comprising the first transition T1 and the determined capture segment.

According to one characteristic of the invention, the joint resolution 406 of the first conflict C1 and of the second conflict C2 comprises:
  the determination of a first straight line Tang1 tangential to the first transition T1 at a first point P1 and tangential to the second transition T2 at a second point P2,
  the determination of a second straight line Tang2 tangential to the second transition T2 at a third point P3 and tangential to the third transition T3 at a fourth point P4.

Figure 6:
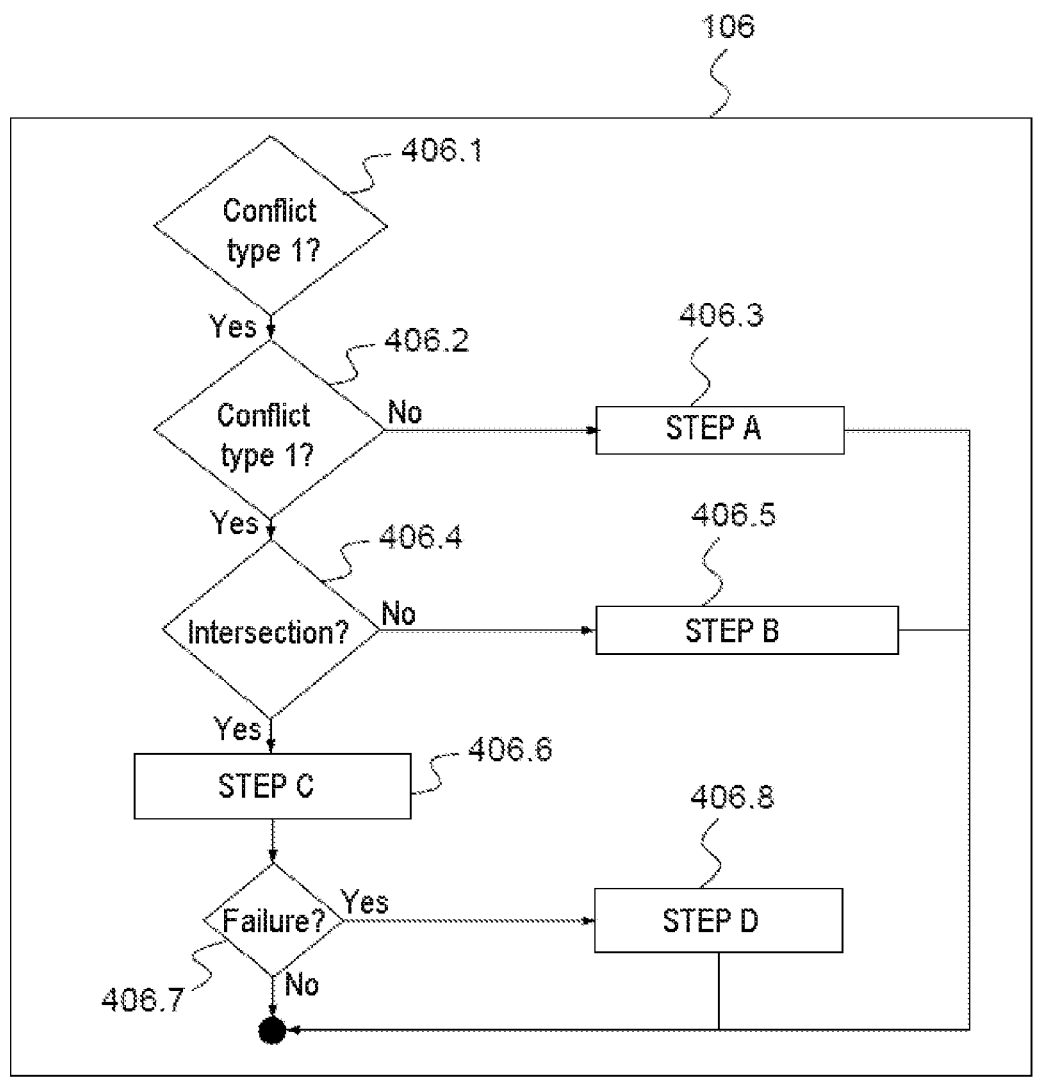
FIG. 6 shows a diagram representing the detail of the step 403 of resolution of the first detected conflict C1.

FIG. 6 shows a diagram representing the detail of the step of joint resolution 406 of the first conflict C1 and the second conflict C2. The joint resolution 406 of the first conflict C1 and the second conflict C2 further comprises:
  If 406.1, the turn of the first transition T1 is in a direction opposite to the direction of the turn of the second transition T2, and
  if 406.2, the turn of the second transition T2 is in a direction identical to the direction of the turn of the third transition T3, then:
    if 406.3 there is no intersection between a portion of the straight line Tang1 defined by the first point and the second point P2, on the one hand, and a portion of the straight line of the second tangential straight line Tang2 defined by the third point P3 and the fourth point P4 on the other hand,
      then a step B 406.5 comprising the determination of the trajectory between the first segment L1 and the fourth segment L4, said trajectory comprising a portion of the first transition T1, a portion of the first tangent Tang1, a portion of the second transition T2, a portion of the second tangent Tang2, a portion of the third transition T3,
    otherwise a step C 406.6 comprising:
      the determination of a transition segment between the first tangent Tang1 and the second tangent Tang2, the transition segment being tangential to the first tangent Tang1 at a fifth point P5 and tangential to the second tangent Tang2 at a sixth point P6.

Figure 8:
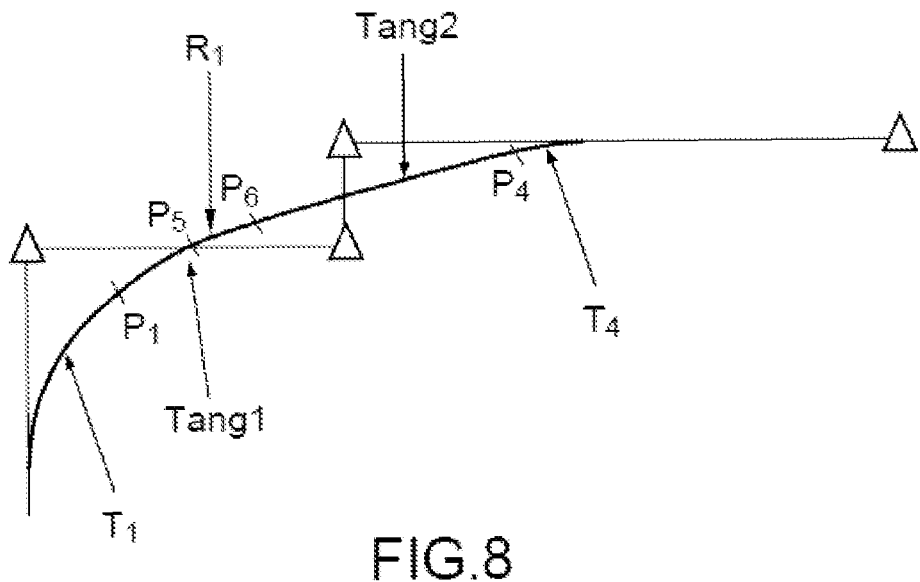
FIG. 8 shows a first example of resolution of a conflict according to the invention.

FIG. 8 shows a first example of resolution of a conflict according to the invention. This involves a resolution according to step C. The trajectory between the first segment L1 and the fourth segment L4 comprises a portion of the first transition T1 going from the first segment L1 to the first point P1, a portion of the first tangent Tang1 going from the first point P1 to the fifth point P5, the transition segment between the fifth point and the sixth point P6, a portion of the second tangent Tang2 between the sixth point P6 and the fourth point P4, and a portion of the third transition T3 between the fourth point P4 and the fourth segment L4.

Figure 9:
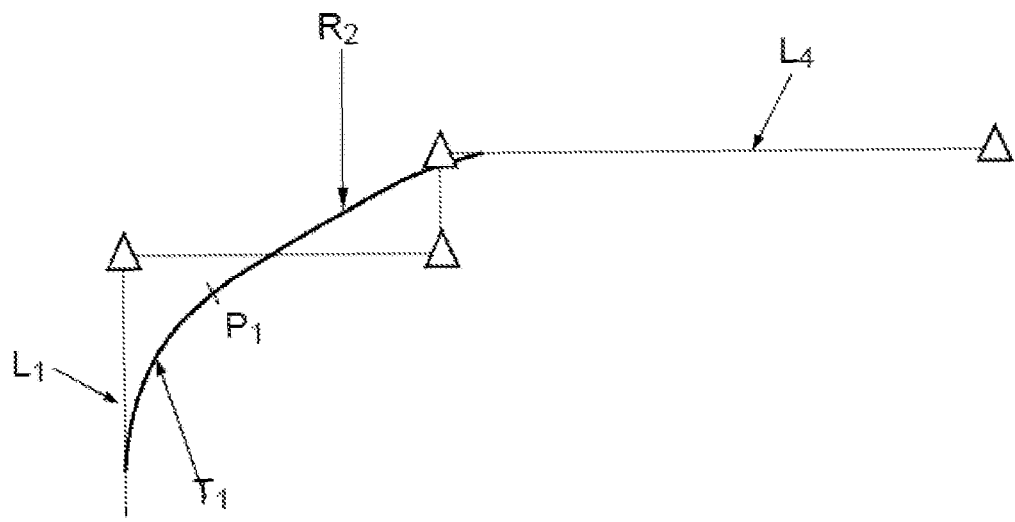
FIG. 9 shows a second example of resolution of a conflict according to the invention.

Advantageously, the method further comprises a step of detection of a conflict between the transition segment and the first transition T1 or the second transition T2. This step takes place after step C. This step comprises, if 406.7 a conflict is detected, a step D 406.8. FIG. 9 shows a second example of resolution of a conflict according to the invention. This involves a resolution according to step D. Step D comprises:
  the determination of a joining segment between the first transition T1 and the fourth segment L4,
  the trajectory between the first segment L1 and the fourth segment L4 comprising a portion of the first transition up to the first point and the joining segment between the first point and the fourth segment L4.

The capture segments are calculated for a capture angle of, for example, 30° or 45°, depending on the speed and performance of the aircraft following the trajectory. The transition segments are calculated with a predetermined radius depending on the speed and performance of the aircraft following the trajectory.

The invention also relates to a device for determining a lateral trajectory of an aircraft, characterized in that it is configured to carry out the method according to the invention.

The invention also relates to a flight management system, characterized in that it comprises the device according to the invention.

The invention claimed is:

1. A method for determination, by a flight management system of an aircraft, of a lateral trajectory of said aircraft on a basis of a predefined flight plan, said flight plan comprising consecutive flight segments delimited by crossing points, said method comprising:
   calculating with a flight management system a first transition between a first segment and a second segment consecutive to the first segment and a second transition between the second segment and a third segment consecutive to the second segment,
   detecting with the flight management system a first conflict between the first transition and the second transition,
   if no conflict is detected with the flight management system, then returning to the transition calculation step applied to the second segment, to the third segment and to a fourth segment consecutive to the third segment,
   otherwise resolving the first detected conflict with the flight management system,
   calculating with the flight management system a third transition between the third segment and a fourth segment,
   detecting with the flight management system a second conflict between the second transition and the third transition,
   if no conflict is detected with the flight management system, then return to the transition calculation step applied to the third segment, to the fourth segment and to a fifth segment consecutive to the fourth segment,
   otherwise jointly resolving the first conflict and the second conflict with the flight management system, wherein jointly resolving the first conflict and the second conflict comprises: determination of a first straight line tangential to the first transition at a first point and tangential to the second transition at a second point with the flight management system, and determination of a second straight line tangential to the second transition at a third point and tangential to the third transition at a fourth point with the flight management system, and
   returning to the step of calculating a transition with the flight management system applied to the fourth segment and to the fifth segment.

2. The method for the determination, by a flight management system of an aircraft, of a lateral trajectory according to claim 1, in which the joint resolution of the first conflict and of the second conflict further comprises:
   determining with the flight management system if the turn of the first transition is in a direction opposite to the direction of the turn of the second transition and,
   determining with the flight management system if the turn of the second transition is in a direction opposite to the direction of the turn of the third transition, then:
   if there is no intersection between a portion of the straight line defined by the first point and the second point, on the one hand, and a portion of the straight line of the second tangential straight line defined by the third point and the fourth point, on the other hand,
   then a step B comprising the determination of the trajectory between the first segment and the fourth segment with the flight management system, said trajectory comprising a portion of the first transition, a portion of the first tangent, a portion of the second transition, a portion of the second tangent, a portion of the third transition,
   otherwise a step C comprising:
   determination of a transition segment with the flight management system between the first tangent and the second tangent, the transition segment being tangential to the first tangent at a fifth point and tangential to the second tangent at a sixth point,
   wherein the trajectory between the first segment and the fourth segment comprises a portion of the first transition going from the first segment to the first point, a portion of the first tangent going from the first point to the fifth point, the transition segment between the fifth point and the sixth point, a portion of the second tangent between the sixth point and the fourth point and a portion of the third transition between the fourth point and the fourth segment.

3. The method for the determination, by a flight management system of an aircraft, of a lateral trajectory according to claim 2, further comprising a step of detection of a conflict between the transition segment and the first transition or the second transition, following the step C, and comprising, if a conflict is detected, a step D comprising:
   determination of a joining segment with the flight management system between the first transition and the fourth segment,
   wherein the trajectory between the first segment and the fourth segment comprises a portion of the first transition up to the first point and the joining segment between the first point and the fourth segment.

4. The method for the determination, by a flight management system of an aircraft, of a lateral trajectory according to claim 2, further comprising:
   determining with the flight management system if the turn of the first transition is in a direction opposite to the direction of the turn of the second transition and,
   determining with the flight management system if the turn of the second transition is in a direction identical to the direction of the turn of the third transition then a step A comprising the determination of the trajectory with a flight management system between the first segment and the fourth segment, said trajectory comprising a portion of the transition, a portion of the tangent, a portion of the transition, the joining segment.

5. The method for the determination, by a flight management system of an aircraft, of a lateral trajectory according to claim 1, in which, a transition being a portion comprising a turn, the resolution of the first detected conflict comprises:
   determining with the flight management system if the turn of the first transition is in a direction opposite to the direction of the turn of the second transition,
   then, the determination of a first straight line tangential to the first transition at a first point and tangential to the second transition at a second point, the trajectory between the first segment and the third segment comprising a portion of the first transition going to the first point, a portion of the first tangent going from the first point to the second point, and a portion of the second transition going from the second point to the third segment,
   otherwise, the determination of a capture segment of the third segment on the basis of the first transition, the trajectory between the first segment and the third segment comprising the first transition and the determined capture segment.

6. A device for determining a lateral trajectory of an aircraft comprising:

a device configured to calculate a first transition between a first segment and a second segment consecutive to the first segment and a second transition between the second segment and a third segment consecutive to the second segment, the device further configured to detect a first conflict between the first transition and the second transition, the device further configured to detect when there is no conflict and to thereafter calculate a transition to the third segment and to a fourth segment consecutive to the third segment, the device otherwise configured to resolve the first detected conflict, the device further configured to calculate a third transition between the third segment and a fourth segment, the device further configured to detect a second conflict between the second transition and the third transition, the device further configured to detect when there is no conflict and to thereafter calculate a transition to the fourth segment and to a fifth segment consecutive to the fourth segment, the device further configured to otherwise jointly resolve the first conflict and the second conflict, wherein the jointly resolve the first conflict and of the second conflict comprises: determination of a first straight line tangential to the first transition at a first point and tangential to the second transition at a second point with the flight management system, and determination of a second straight line tangential to the second transition at a third point and tangential to the third transition at a fourth point with the flight management system, and the device further configured to calculate a transition to the fourth segment and to the fifth segment.

7. A flight management system, comprising the device according to claim 6.

* * * * *